US009793956B2

(12) United States Patent
Tsai

(10) Patent No.: US 9,793,956 B2
(45) Date of Patent: Oct. 17, 2017

(54) DATA TRANSMISSION STRUCTURE

(75) Inventor: Hsiung-Kuang Tsai, Taipei (TW)

(73) Assignee: SLIM HMI TECHNOLOGY, Taipei (TW)

(*) Notice: Subject to any disclaimer, the term of this patent is extended or adjusted under 35 U.S.C. 154(b) by 0 days.

(21) Appl. No.: 14/403,517

(22) PCT Filed: May 25, 2012

(86) PCT No.: PCT/CN2012/076056
§ 371 (c)(1),
(2), (4) Date: Nov. 24, 2014

(87) PCT Pub. No.: WO2013/174006
PCT Pub. Date: Nov. 28, 2013

(65) Prior Publication Data
US 2015/0180545 A1    Jun. 25, 2015

(51) Int. Cl.
H04B 5/00      (2006.01)
G06F 13/38     (2006.01)

(52) U.S. Cl.
CPC ......... *H04B 5/0031* (2013.01); *G06F 13/382* (2013.01)

(58) Field of Classification Search
CPC .... G06Q 20/32; G06Q 20/20; G06Q 20/3278; G06Q 20/327; G06Q 30/0238; G06Q 30/0268; G06Q 30/0641; H04B 5/0031
USPC ........................................................ 455/41.1
See application file for complete search history.

(56) References Cited

U.S. PATENT DOCUMENTS 8,219,028 B1 *   7/2012  Flamholz .................. 455/41.2
2003/0114120 A1   6/2003  Kwong et al.
2011/0304583 A1  12/2011  Kruglick
2012/0021684 A1   1/2012  Schultz et al.
2012/0208514 A1 *  8/2012  Park ...................... G06F 3/0484
                                                       455/418

(Continued)

FOREIGN PATENT DOCUMENTS

CN   1573763 A    2/2005
CN   102394866 A   3/2012
CN   102422552 A   4/2012

(Continued)

OTHER PUBLICATIONS

Hodges et al., "ThinSight: A new interaction technology for ubicomp". 9th International Conference on Ubiquitous Computing, 2007, 4 pages.

(Continued)

*Primary Examiner* — Nay A Maung
*Assistant Examiner* — Angelica M Perez
(74) *Attorney, Agent, or Firm* — Muncy, Geissler, Olds & Lowe, P.C.

(57) ABSTRACT

A data transmission structure comprises a system and a visual interface display apparatus. The system includes a host, a receiving unit and at least a transmission module. The host is coupled with the receiving unit and the transmission module. The visual interface display apparatus includes a receiving module and a display module including a display panel. When the receiving module receives the transmission data transmitted by the transmission module, the display panel couples the response data corresponding to the transmission data to the system through at least an electrode of the display panel, and the response data is received by the receiving unit.

15 Claims, 2 Drawing Sheets

(56) References Cited

U.S. PATENT DOCUMENTS

2012/0268414 A1* 10/2012 Alameh ............. G06F 3/03545
                                                                            345/174

FOREIGN PATENT DOCUMENTS

| | | |
|---|---|---|
| GB | 2471161 | 12/2010 |
| JP | 07-020421 A | 1/1995 |
| JP | H07-46515 A | 2/1995 |
| JP | 2010-074701 A | 4/2010 |
| TW | 201110048 A | 3/2011 |
| TW | 201201111 A | 1/2012 |
| TW | 201204161 A | 1/2012 |
| WO | WO 2011/155939 * | 12/2011 |
| WO | WO-2011/155939 A1 | 12/2011 |

OTHER PUBLICATIONS

Kunihiro Saito, "Improving web service efficiency, part 2: in view of enhancing script function in major market" Nikkei, Internet Technology, Nikkei BP, Nov. 22, 1999, No. 29, pp. 128-135, with concise English statement of relevance.

* cited by examiner

DATA TRANSMISSION STRUCTURE

BACKGROUND OF THE INVENTION

Field of Invention

The invention relates to a data transmission structure.

Related Art

In recent years, for expanding the applications of the consumer electronics, people start to introduce the near field communication (or short range wireless communication) technology in the electronic products. Near field communication can allow the transmission, such as command, music, picture, business card, data or file from an electronic apparatus to another electronic apparatus without establishing physical circuit connection, so that the electronic apparatuses can be more favorable for transmitting the data. Thus, the electronic apparatus can be widely applied to, for example, the occasions requiring IC cards, such as access control, tickets, credit cards, or on the occasion of receiving advertising information. For example, the customers can use their smart phones to receive the coupon from the screen in the market through the Bluetooth and then re-transmit their orders to the order system of the market. Therefore, electronic products configured with the near field communication function are getting more and more popular.

What is required in these applications, different from the conventional long range communication, is a method that can transfer the data within a short range, even accessible by user's hands. Therefore, it is an important subject to provide an innovative data transmission structure that can provide a function similar to the near field communication so as to achieve the wireless communication and thus expand the applicability of the electronic apparatus.

SUMMARY OF THE INVENTION

In view of the foregoing subject, an objective of the invention is to provide an innovative data transmission structure which not only can receive the transmission data transmitted from the system but also couple a response data corresponding to the transmission data to the system through the display surface so as to further interact with the system, and therefore achieves the wireless transmission and expands the application of the electronic apparatus.

To achieve the above objective, a data transmission structure according to the invention comprises a system and a visual interface display apparatus. The system includes a host, a receiving unit and at least a transmission module. The host is coupled with the receiving unit and the transmission module. The visual interface display apparatus includes a receiving module and a display module including a display panel. When the receiving module receives the transmission data transmitted by the transmission module, the display panel couples a response data corresponding to the transmission data to the system through at least an electrode of the display panel, and the response data is received by the receiving unit.

In one embodiment, the transmission module includes another display panel, a wired or wireless local network module, a telecommunication network module or a Bluetooth module for transmitting the transmission data.

In one embodiment, when the transmission module is another display panel, the transmission data is coupled to the receiving module from an electrode of the another display panel.

In one embodiment, the system further includes at least a transmission device coupled with the host.

In one embodiment, the transmission device includes the transmission module.

In one embodiment, the transmission device includes an identity recognition module, a display module, an image extraction module or a touch module.

In one embodiment, the transmission device includes the receiving unit.

In one embodiment, when a user contacts the receiving end of the visual interface display apparatus and the emitting end of the transmission module, the transmission data is coupled to the receiving module through the user.

In one embodiment, the visual interface display apparatus further includes a computing module that can generates the response data by processing the transmission data.

In one embodiment, at least one of the transmission data and the response data includes identity recognition information which is used to identify the visual interface display apparatus or the user or owner of the visual interface display apparatus.

In one embodiment, the identity recognition information includes personal ID data, or cipher, or identification code of the visual interface display apparatus, or data of the answer to specific question, or picture data, or personal signature data.

In one embodiment, the system deciphers the content of the transmission data received by the visual interface display apparatus through the response data.

In one embodiment, the visual interface display apparatus processes the transmission data according to an algorithm to generate the response data.

In one embodiment, the system processes the received response data by using another algorithm corresponding to the algorithm.

In one embodiment, the information inputted to the algorithm includes the transmission data and at least one local data of the visual interface display apparatus, and the local data includes a picture, a cipher or a file.

As mentioned above, the data transmission structure of the invention comprises a system and a visual interface display apparatus. The system includes a host, a receiving unit and at least a transmission module. The visual interface display apparatus includes a receiving module and a display module. When the receiving module receives the transmission data transmitted by the transmission module of the system, the display panel of the display module can couple the response data corresponding to the transmission data to the system through at least an electrode of the display panel, and the response data is received by the receiving unit. Thereby, the visual interface display apparatus can not only receive the transmission data transmitted by the system but also couple the corresponding response data to the system through the display panel so as to further interact with the system, and therefore the wireless transmission can be achieved and the applicability of the visual interface display apparatus can be expanded.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
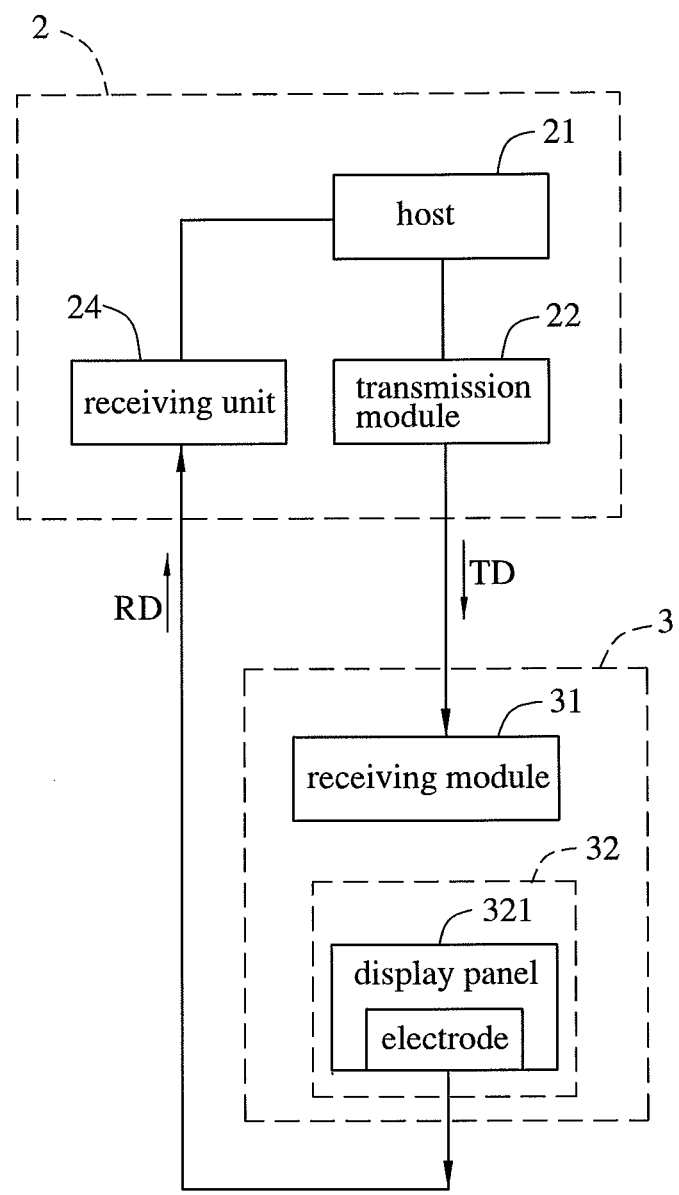
FIG. 1 is a schematic block diagram of a data transmission structure of an embodiment of the invention.

FIG. 1 is a schematic block diagram of a data transmission structure of a preferred embodiment of the invention.

As shown in FIG. 1, the data transmission structure includes a system 2 and a visual interface display apparatus 3. The system 2 and the visual interface display apparatus 3 can include sub-apparatuses or sub-modules with the functions of computation, control, storage, receiving, transmission, etc. The so-called apparatus or module can be composed of hardware, software, firmware or their any combination.

The system 2 includes a host 21, a receiving unit 24 and at least a transmission module 22, and the host 21 is coupled with the receiving unit 24 and the transmission module 22. Herein for example, the system includes a single transmission module 22. The system 2 can be an electronic system, such as an interactive advertisement system, an order system for market promotion, an access identification system, an information inquiry system, an ATM system, a portable mobile apparatus or other systems involving data transmission. The host 21 can couple with the receiving unit 24 and the transmission module 22 by wire, with a physical cable, or wireless, with signals. Here, the wireless is taken as an example. The host 21 can include the core control assembly of the system 2, such as CPU, memory or other hardware, software, firmware or their any combination. The host 21 also can include a display unit, a transmission unit, a storage unit or other control units. The transmission module 22 can be, for example, a display panel, a wired or wireless local network module (wireless network module can be WI-FI or WLAN for example), a wired or wireless telecommunication network module or a Bluetooth module.

The visual interface display apparatus 3 can be, for example, a smart phone, a PDA, a tablet PC or other kinds of portable display apparatus. The visual interface display apparatus 3 includes a receiving module 31 and a display module 32. The display module 32 can include a display panel 321 and the display panel 321 includes at least an electrode. The display panel 321 can include an active matrix or a passive matrix, and here the illustration is based on an active matrix as an example. The display panel 321 can be an LCD panel, an OLED panel, an LED panel, an electrophoretic display panel, a touch display panel or a MEMS display panel for example. The electrode can be a separate electrode outside the displaying area of the display panel 321, or can be one of the plural column or row electrodes within the displaying area. The electrodes can transmit the signal by coupling the signal through capacitance or inductance.

As shown in FIG. 1, the host 21 of the system 2 can transmit a transmission data TD to the visual interface display apparatus 3 through the transmission module 22. The transmission data TD can be digital data, digital data stream or digital file stream, and can be, according to the purpose, touch information, command information, identification information, trade information, advertisement information, coupon information, file (such as text file, picture file, music file, or video file) or other information. As to the source of the transmission data TD, it can be generated by the system 2 or system 2 obtains from other external devices. All these are not limited here.

The receiving module 31 corresponds to the transmission module 22, and a protocol is used therebetween for the data interchange. If the transmission module 22 is a local network module, telecommunication network module or Bluetooth module, the receiving module 31 of the visual interface display apparatus 3 can receive the transmission data TD transmitted by the transmission module 22 in wire or wireless way. If the transmission module 22 is a display panel (not shown), the transmission data TD can be coupled to the receiving module 31 of the visual interface display apparatus 3 through the display panel. In such case, the transmission data TD can be coupled to the receiving module 31 from at least an electrode of the display panel (transmission module 22). For example, the transmission data TD can be coupled when the receiving module 31 and the transmission module 22 approach each other. Otherwise, the human body also can be used as the transmission medium. When the user contacts the receiving end of the receiving module 31 of the visual interface display apparatus 3 and the emitting end of the transmission module 22 (display panel) at the same time, the transmission data TD can be coupled, both capacitively, from the emitting end to human body and then to the receiving end and be received by the receiving module 31.

When the receiving module 31 receives the transmission data TD transmitted by the transmission module 22, the display panel 321 can couple the response data RD corresponding to the transmission data TD to the system 2 through at least an electrode of the display panel 321, and the response data RD can be received by the receiving unit 24. Herein, the electrode can be a separate electrode outside the displaying area of the display panel 321, or can be one of the plural column or plural row electrodes within the displaying area. Moreover, the above coupling indicates that the digital information (i.e. 0 or 1) is transmitted to the system 2 from the visual interface display apparatus 3 in a wireless manner. Besides, in order to ensure the correctness of the transmission of the response data RD, the response data with same content can be transmitted repeatedly at different times. Accordingly, the correctness of the transmission of the response data RD can be verified. In case of any abnormality, the transmission of response data RD can be repeated and verified again to ensure correct data is received by the system 2.

As a specific example, if the system 2 is an access control system, the transmission data TD corresponding to the information of the access control (such as a static staff number, or ID information generated by dynamical encoded staff number, or a predetermined query) can be transmitted to the visual interface display apparatus 3 (such as a cell phone) through the transmission module 22 of the system 2. When the user needs to get the access, the user can take the visual interface display apparatus 3 (such as cell phone) to make the display surface approach or contact the system 2 so as to transmit the response data RD to the receiving unit 24 of the system 2. Then, the system 2 can identify the user through the response data RD to determine if the access is permitted or not. The response data RD is generated through the computation (such as decryption, encryption) of the transmission data TD, which is implemented by the visual interface display apparatus 3. In addition to the transmission data TD, other user's information also can be included in the computation, and the system can confirm the identity accordingly. In comparison with other identification methods, the identification method implemented by this data transmission structure has the following features. The transmission data TD can be configured with a dynamic mechanism so that it can be updated at anytime or be transmitted according to the user's request; the system 2 also can use the time difference between sending the transmission data TD and receiving the response data RD as the valid period of identification; the request of the visual interface display apparatus 3 to approach or contact a receiving unit belonging to the system 2 for transmitting the response data RD, the receiving unit can be configured with additional camera, or camcorder and recognition function to enhance the security. The same structure also can be applied to the trading occasions such as shopping or payment that requires strict identity verification. Otherwise, the data transmission structure of this invention also can be applied to the occasions that require less strict identity verification. For example, the system 2 is an electronic commerce system of a company and can deliver the electronic coupon ticket of a shop to a person's cell phone (visual interface display apparatus 3) through the telecommunication network, and the user can transmit the coupon ticket to the system 2 through the cell phone (visual interface display apparatus 3) to obtain the discount when shopping in the shop.

Figure 2:
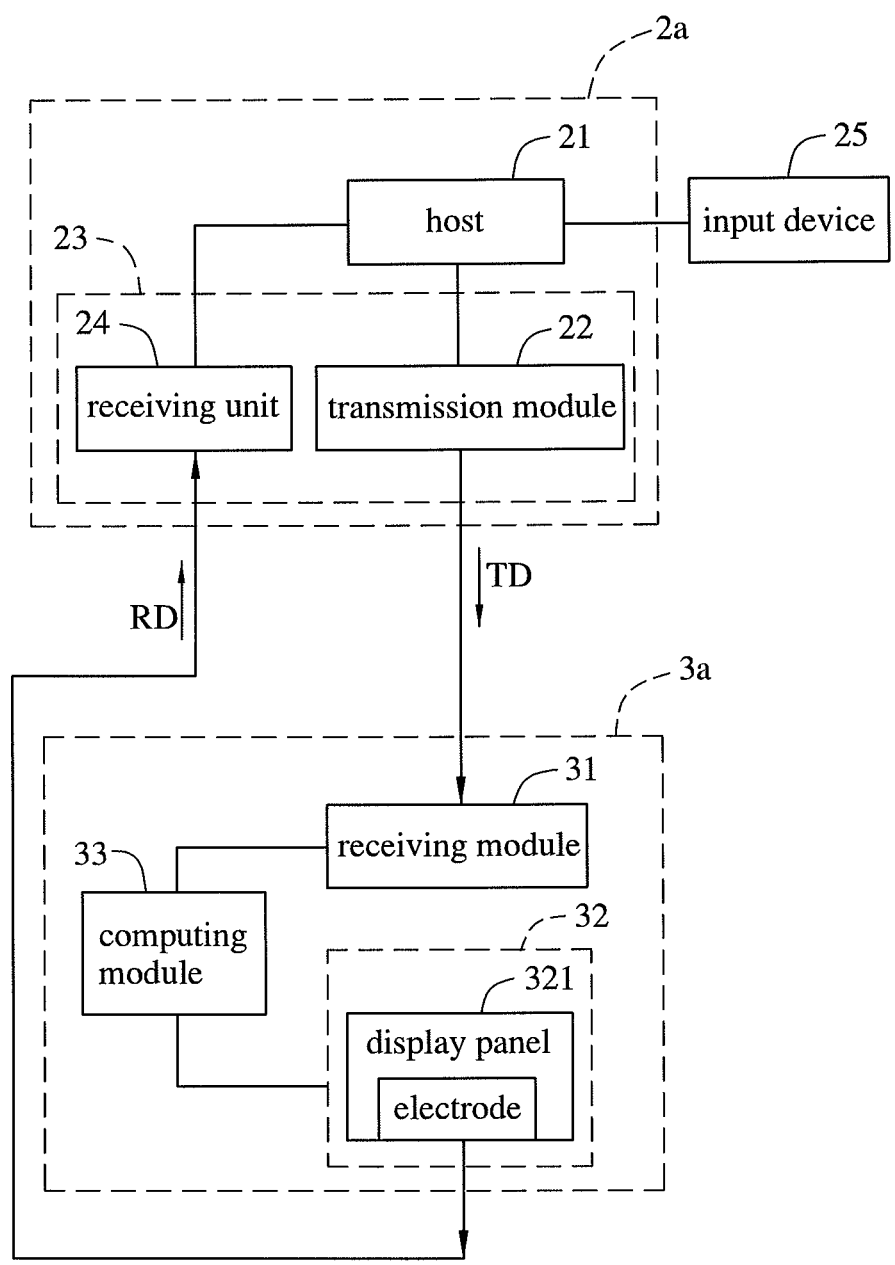
FIG. 2 is a schematic block diagram of another data transmission structure of the invention.

In the above operating mode, the transmission of the transmission data TD is initiated by the system 2. However, the transmission data TD also can be transmitted in response to the user's request. FIG. 2 is a schematic block diagram of another data transmission structure of the invention, and herein for example, the system 2a is an advertisement system and the visual interface display apparatus 3a is a smart phone, but this is not meant to be construed in a limiting sense. Or, the system 2a can be a POS (point of sale) system in the market, an access control and identification system, ATM system of a bank, an information inquiry system or another data transmission system, and the visual interface display apparatus 3a can be another portable display apparatus, such as a tablet computer or notebook computer.

The advertisement system (system 2a) can provide the hotel or restaurant information near the airport or station, and in such case, a public display (transmission device 23) for advertisement can be used as the transmission medium. When the user finds a target, the user can download the transmission data TD (address, coupon ticket, QR code, picture, video, description, etc.) to the cell phone, tablet computer or another personal portable electronic apparatus (visual interface display apparatus 3) or receive the above transmission data TD by making the receiving module 31 of the visual interface display apparatus 3a approach or contact the public display (transmission module 22 of the transmission device 23). When arriving at the destination, the user can acquire discount by transmitting the response data RD through at least an electrode of the display panel 321 of the visual interface display apparatus 3a. Moreover, for the selling and payment system of large-size products, the user can make the receiving module 31 of the visual interface display apparatus 3a approach or contact a transmission device of the system 2a to receive the interested product information (transmission data TD) and then deliver the order information (response data RD) back to the system 2a to finish the order at the payment counter. In other words, by making the receiving module 31 of the visual interface display apparatus 3a to approach or contact the transmission module of a transmission device of the system 2a, the information, such as advertisement, coupon or geographical information, can be transmitted to the cell phone, tablet computer or another personal portable electronic apparatus.

Then, the user can couple the corresponding response data RD (such as order information) to a receiving unit 24 of the system 2 through the visual interface display apparatus 3a. Besides, the advertisement system (system 2a) can inform the user that the order has been completed after the ordering operation is finished.

In this embodiment, as shown in FIG. 2, in addition to the host 21 and the transmission module 22, the system 2a can further include at least a transmission device 23 which can include the transmission module 22 and is coupled with the host 21. However, in other embodiments, the transmission device 23 also can be included in the host 21. Herein for example, the transmission device 23 is a display apparatus and can be an LCD apparatus, an OLED display apparatus, an LED display apparatus, an electrophoretic display apparatus or a MEMS display apparatus. However, this invention is not limited thereto. In other words, the advertisement system (system 2a) of this embodiment includes a transmission device 23 and the transmission device 23 is a display apparatus that includes the transmission module 22. Besides, the transmission device 23 also can include an identity recognition module (for identifying the identity), a display module, an image extraction module or a touch module (not shown). Herein, the identity recognition module, display module, image extraction module or touch module can be composed of hardware, software, firmware or their any combination.

The receiving unit 24 can receive the response data RD that is coupled from the display panel 321, and can transmit the response data RD to the host 21. The transmission device 23 includes the receiving unit 24 in this embodiment, but however, the host 21 also can include the receiving unit 24 in other embodiments. Besides, the system 2a can further include an input device 25 that is coupled with the host 21. The input device 25 can be, for example, a mouse, a keyboard, a flash drive or their any combination, or another electronic apparatus which can input information. Therefore, the information such as product or service information can be inputted to the system 2a by the input device 25 and then transmitted to the visual interface display apparatus 3a through the transmission module 22.

In addition to the receiving module 31 and the display module 32, the visual interface display apparatus 3a can further include a computing module 33, which can process the transmission data TD to generate the response data RD. The processing includes encoding, encryption, decryption, adding identity information or other response information, etc. Herein, after receiving the transmission data TD, the computing module 33 can process the transmission data TD according to an algorithm. The information inputted to the algorithm can include the transmission data TD and at least one local data of the visual interface display apparatus 3a. Herein, the local data can be an internal information of the visual interface display apparatus 3a, such as identification code, user ID, cipher, and can include a picture (such as the user's photo), a cipher (such as the cipher specified by the user) or a files (such as the identity code of the visual interface display apparatus 3a or user's ID data). Besides, the transmission data TD and the local data can be treated with encryption, decryption or other processes by the algorithm.

Accordingly, the computing module 33 can add the identification information of the visual interface display apparatus 3a or the user or owner ID of the visual interface display apparatus 3a in the response data RD, so that at least one of the transmission data TD and the response data RD can include the identity recognition information. The identity recognition information can be used to identify the visual interface display apparatus 3a or the user or owner of the visual interface display apparatus 3a. Herein, the identity recognition information can include personal ID data, cipher, identification code of the visual interface display apparatus 3a, answer to a specific question, picture data, personal signature data or other information. Besides, computing module 33 can send the response data RD to the display module 32 so that the response data RD can be coupled to the system 2a through the electrode of the display panel 321.

When the system 2a receives the response data RD from the receiving unit 24, the system 2a can decrypt the content of the transmission data TD received by the visual interface display apparatus 3a according to the response data RD. Herein, when the receiving unit 24 receives the response data RD, the host 21 can process the received response data RD by using another algorithm corresponding to the algorithm of the computing module 33 of the visual interface display apparatus 3a and can identify the identity with the identity recognition module included in the transmission device 23. Thereby, the system 2a can judge which product or service ordered by the customer, the order information transmitted by which brand or serial number of the visual interface display apparatus 3a, and even which customer orders the product or service. To confirm the order of product or service, the system 2a can transmit confirmation message to the customer.

In summary, the data transmission structure of the invention comprises a system and a visual interface display apparatus. The system includes a host, a receiving unit and at least a transmission module. The visual interface display apparatus includes a receiving module and a display module. When the receiving module receives the transmission data transmitted by the transmission module of the system, the display panel of the display module can couple a response data corresponding to the transmission data to the system through at least an electrode of the display panel, and the response data is received by the receiving unit. Thereby, the visual interface display apparatus can not only receive the transmission data transmitted by the system but also couple the corresponding response data to the system through the display panel so as to further interact with the system, and therefore the wireless transmission can be achieved and the applicability of the visual interface display apparatus can be expanded.

The embodiments presented above are for purpose of example, it is not meant to be constructed in a limiting sense. Equivalent modifications or variations without parting from the spirit and scope of the present invention should be included in the scope of appended claims.

What is claimed is:

1. A data transmission structure, comprising:
  a system including a receiving unit, at least a transmission module and a host coupled with the receiving unit and the transmission module; and
  a visual interface display apparatus including a receiving module and a display module including a display panel, wherein the display panel includes a display matrix, the display matrix includes a plurality of row electrodes and a plurality of column electrodes, a display signal for displaying image is transmitted to a row electrode and a column electrode in a display area of the display panel so as to display image by the display panel, wherein when the receiving module receives a transmission data transmitted by the transmission module, a response data is generated according to the transmission data and is transmitted to at least one of the plurality of row electrodes and the plurality of column electrodes of the display matrix in the display area of the display panel so as to be wirelessly coupled to the receiving unit of the system through a direct coupling between the at least one of the plurality of row electrodes and the plurality of column electrodes of the display matrix of the display panel and the receiving unit of the system, and the response data is received by the receiving unit, the transmitting module and the receiving module establish a first data transmission path, and the row electrode and the column electrode for transmitting the display signal of the display panel and the receiving unit establish a second data transmission path, the first data transmission path and the second data transmission path constitute bi-directional data transmission between the system and the visual interface display apparatus.

2. The data transmission structure as recited in claim 1, wherein the transmission module includes another display panel, a wired or wireless local network module, a telecommunication network module or a Bluetooth module for transmitting the transmission data.

3. The data transmission structure as recited in claim 1, wherein when the transmission module is another display panel, the transmission data is transmitted to at least one of a plurality of row electrodes and a plurality of column electrodes of a display matrix of the another display panel so as to be wirelessly coupled to the receiving module through a direct coupling between the at least one of the plurality of row electrodes and the plurality of column electrodes of the display matrix of the another display panel and the receiving module.

4. The data transmission structure as recited in claim 1, wherein the system further includes at least a transmission device coupled with the host.

5. The data transmission structure as recited in claim 4, wherein the transmission device includes the transmission module.

6. The data transmission structure as recited in claim 4, wherein the transmission device includes an identity recognition module, a display module, an image extraction module or a touch module.

7. The data transmission structure as recited in claim 4, wherein the transmission device includes the receiving unit.

8. The data transmission structure as recited in claim 3, wherein when a user contacts the receiving end of the visual interface display apparatus and the emitting end of the transmission module, the transmission data is coupled to the receiving module through the user.

9. The data transmission structure as recited in claim 1, wherein the visual interface display apparatus further includes a computing module, which processes the transmission data to generate the response data.

10. The data transmission structure as recited in claim 1, wherein, the transmission data or the response data includes identity recognition information for identifying the visual interface display apparatus or the user or owner of the visual interface display apparatus.

11. The data transmission structure as recited in claim 10, wherein the identity recognition information includes personal ID data, cipher, identification code of the visual interface display apparatus, answer to a specific question, picture data, personal signature data.

12. The data transmission structure as recited in claim 1, wherein the system decrypts the content of the transmission data received by the visual interface display apparatus through the response data.

13. The data transmission structure as recited in claim 1, wherein the visual interface display apparatus processes the transmission data according to an algorithm to generate the response data.

14. The data transmission structure as recited in claim 13, wherein the system processes the received response data by using another algorithm corresponding to the algorithm.

15. The data transmission structure as recited in claim 13, wherein the information inputted to the algorithm includes the transmission data and at least one local data of the visual interface display apparatus, and the local data includes a picture, a cipher or a file.

* * * * *